BEST AVAILABLE COPY
M. B. BENSON.
BRAKE AND ANCHOR OPERATING AND RELEASING MEANS FOR TRAVELING BRIDGES.
APPLICATION FILED FEB. 17, 1921.
1,437,710.   Patented Dec. 5, 1922.
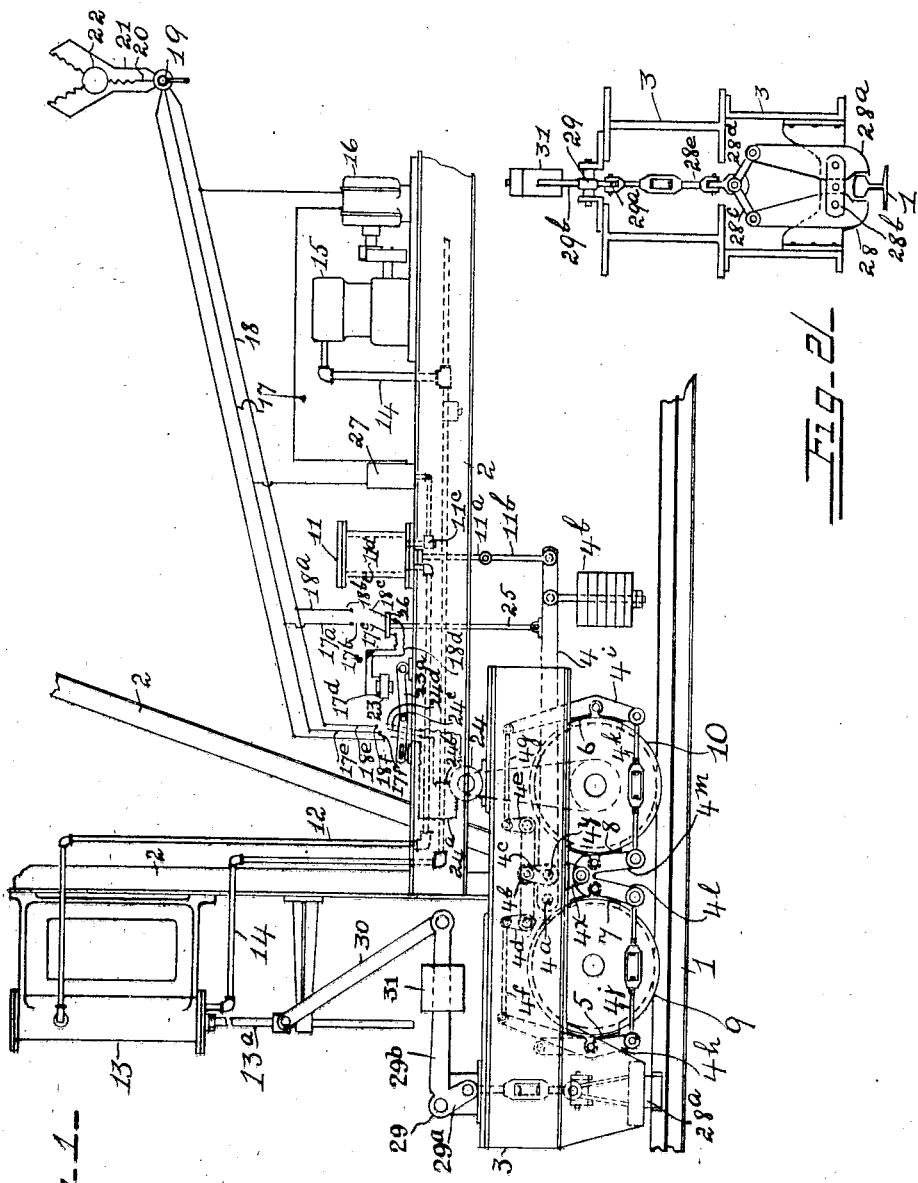
INVENTOR
Melvin B. Benson
BY James T. Watson
ATTORNEY Patented Dec. 5, 1922.

1,437,710

UNITED STATES PATENT OFFICE.

MELVIN B. BENSON, OF SUPERIOR, WISCONSIN.

BRAKE AND ANCHOR OPERATING AND RELEASING MEANS FOR TRAVELING BRIDGES.

Application filed February 17, 1921. Serial No. 445,692.

*To all whom it may concern:*

Be it known that I, MELVIN B. BENSON, a citizen of the United States, residing at Superior, in the county of Douglas and State of Wisconsin, have invented certain new and useful Improvements in Brake and Anchor Operating and Releasing Means for Traveling Bridges, of which I do declare the following to be a specification.

My invention relates to brake and anchor operating and releasing means for traveling bridges, and has for its object the provision of improved means for setting and releasing brakes and anchors employed to prevent the movement of traveling bridges, cranes or carriages. With these and other objects in view, it consists of the structures, combinations and arrangements of parts hereinafter described and claimed.

In the drawings, Fig. 1, is a fragmentary side elevation of a traveling bridge employing my said invention, certain electric circuits and devices being shown in diagram. Fig. 2, is a detail end elevation of a portion of the hereinafter described truck and anchor.

In the drawings, 1, is a railway track; 2 is a portion of a bridge frame; 3 is one of the trucks adapted to travel upon said track, and upon which said frame is mounted. Said trucks or frame may be of any suitable structure. Pivotally secured near one end to the frame of said truck, as at $4^a$, is a brake lever 4, the opposite end of which is weighted in any suitable manner, as by a weight $4^b$ suspended therefrom. Near its pivoted end as at $4^y$, said lever is connected by means of any suitable transmission mechanism or levers, as by links $4^b$, $4^c$, bell cranks $4^d$, $4^e$, rods $4^f$, $4^g$, levers $4^h$, $4^i$, rods $4^j$, $4^k$, links $4^l$, $4^m$, and bracket $4^x$ with brake shoes 5, 6, 7, 8, which shoes are adapted to be applied by said weight lever and transmission mechanism to the wheels 9, 10, of said truck when said lever is operated by gravity. The specific arrangement and structure of such transmission, or the number of brake shoes may however be altered or modified within the spirit and scope of certain of my claims.

Connected to said lever at any suitable point, is a link or connecting rod $11^b$, one end of which is connected to a piston rod $11^a$, extending from an air or brake cylinder 11. The intake end of said cylinder, below the piston therein (not shown) communicates in any suitable manner, as by a pipe 12 with the upper or exhaust end of a second air cylinder 13, the lower or intake end of which second cylinder communicates in any suitable manner as by a pipe 14, with the exhaust end of an air compressor or pump 15, which compressor is operated by an electric motor 16.

Said motor is included in an electric circuit comprising the wires 17 and 18, the controller 19, wires 20 and 21, and a generator 22. Said wires 17 and 18 are tapped by the wires $17^a$ and $18^a$ which are connected to normally open contacts $17^b$ and $18^b$ of an electric cut-out switch or circuit closer. Adjacent to said contacts, but insulated therefrom and from each other, are contacts $17^c$ and $18^c$ which latter contacts are in circuit through suitable connecting wires $17^d$ and $18^d$ with an electro-magnet 23. Said contacts $17^c$ and $18^c$ are adapted to be brought into electrical communication with the contacts $17^b$ and $18^b$, respectively, by a contact closer of any suitable construction adapted to be mechanically operated by the brake lever 4, as will appear. Said wires 17 and 18 are also tapped by wires $17^e$ and $18^e$ which are connected to normally open contacts $17^f$, $18^f$ adjacent to said magnet 23. 24 is an electric propelling motor of any suitable structure, which is geared to one of said trucks. The poles of said motor 24 are connected by wires $24^a$ and $24^b$ with normally open contacts $24^c$ and $24^d$ adjacent to said contacts $17^f$ and $18^f$ and are adapted to be brought into electrical communication with said contacts $17^f$ and $18^f$ by a circuit closer $23^a$ of any suitable structure adapted to be operated by said magnet 23. Connected at one end to said brake lever 4, is a link 25, which link is connected at its opposite end to a circuit closer 26, which is adapted to be operated by said link, when said lever 4 is in its raised position, to establish electric communication between the contact points $17^b$ and $17^c$ and between the contact points $18^b$ and $18^c$. The electric circuits as thus far described are substantially similar to the circuits described in Letters Patent No. 1,320,971, dated Nov. 4, 1919, granted to me for propelling and braking means for traveling cranes and carriages. In my present invention, however, I prefer to interpose in the circuit which includes said motor 16, the coil of a solenoid 27, which solenoid is adapted in operation to close an exhaust valve 11$^c$ of any suitable structure positioned in the lower or pressure end of said cylinder 11, and when de-energized and retracted said solenoid is adapted to open said valve 11$^c$. Near the upper end of said cylinder 11, is a safety exhaust port 11$^d$, adapted to exhaust excess pressure if the piston in said cylinder rises above said port.

Mounted upon and secured to said frame or truck in any suitable and convenient position and adapted to grasp the rail 1, is an anchor of any suitable construction, as including clamping jaws 28, 28$^a$, coupled together near their lower ends by a link 28$^b$, and connected at their upper ends by toggle links 28$^c$, 28$^d$, to a connecting rod 28$^e$, which at its opposite end is connected to one arm 29$^a$ of a bell crank lever 29, the opposite arm 29$^b$, of which lever is connected by a connecting rod 30 with the outer end of a piston rod 13$^a$ extending from the intake end of said cylinder 13. A weight 31 is positioned upon said arm 29$^b$ to operate said lever 29. The intake end of said cylinder 13, is connected by a pipe 14 with the exhaust end of said compressor. It will be observed that the air compressor 15, the cylinder 13 and the cylinder 11 are in series.

In operation, the current from the generator being turned on at the controller, said current first flows to the compressor motor 16 and solenoid 27, causing the solenoid through its armature and transmission means to close the exhaust valve 11$^c$ for said cylinder 11, and operating said motor 16, which operates the compressor which delivers a flow of compressed air first to the cylinder 13, thereby operating the piston in said cylinder which through transmission raises the weighted end of said bell crank lever 29, which lever draws upon said toggle bars so as to release said clamping jaws from operative contact with said rail. After which operation, excess air pressure escapes from said cylinder 13 through pipe 12 to the pressure end of cylinder 11 thereby operating the piston therein and causing it to raise the free or weighted end of the brake lever 4, thus freeing the brake shoes from contact with the wheels. At the same time the raising of the brake lever 4 causes the link 25 and circuit closer 26 to close contact between the points 17$^b$ and 17$^c$ and between 18$^b$ and 18$^c$, whereupon current will flow from said source or generator to said magnet 23. Said magnet 23 will now operate circuit closer 23$^a$ and thereby close the circuit to the propelling motor 24 through contacts 24$^c$, 24$^d$ and the bridge will then move along said track. It will be observed that the anchor is first released while the wheel brakes remain applied; then the wheel brakes are released, and then the propelling motor commences to operate.

When the current from said generator is cut off, the air pressure first or more rapidly escapes from said cylinder 11 through the valve 11$^c$ permitting the weight 4$^b$ to operate said lever 4 to apply the brakes to said wheels. The slower exhaust of the air from cylinder 13 by leakage thereafter permits the weight 31 to operate said lever 29 to set said anchor in gripping position with respect to said rails.

Similar or additional brake and anchor systems dependent upon the same air compressor and compressor-motor, may if desired be installed at other points on such bridge, as will be readily understood.

The operation of my said invention insures that the wheel brakes will be set promptly—upon the stoppage of current from any cause; that closely following the application of the wheel brakes, the anchor will be set in operation; that said anchor cannot be applied before the application of the wheel brakes; that the wheel brakes cannot be released before the anchor is released; and that the propelling motor cannot operate while either the anchor or the wheel brakes are applied.

What I claim is—

1. The combination with an electrically propelled vehicle, of an anchor adapted to be set in operation by a gravity operated device, fluid actuated means adapted to retract said gravity operated device, a wheel brake adapted to be set in operation by a second gravity operated device, a second fluid actuated means adapted to retract said second gravity operated device, said second fluid actuated means and said first fluid actuated means being in part interdependent whereby, said second fluid actuated means is prevented from retracting said second gravity operated device until said first fluid actuated means has retracted said first gravity operated device and whereby said first fluid actuated means is prevented from being itself retracted before said second fluid actuated means has been retracted.

2. The combination with a wheel supported vehicle, of a rail track for said vehicle, an anchor for said vehicle, said anchor being adapted in operation to grip or clamp a rail of said track, gravity operated means for setting said anchor in operation, an air compressor, electric means for operating said compressor, an air cylinder connected to said compressor and containing a piston, fluid actuated means including said cylinder and piston for retracting said gravity operated means to release said anchor, a wheel brake, gravity operated means for setting said wheel brake in operation, a second air cylinder connected at its intake end to the exhaust end of said first air cylinder and containing a piston, fluid actuated means including said second cylinder and piston for retracting the gravity operating means for setting said wheel brake, a source of electricity, a propelling motor for said vehicle in normally open circuit with said source, and means for automatically closing said circuit at one point when the wheel brake is retracted and released.

3. The combination with a wheel supported vehicle, of a rail track therefor, an anchor for said vehicle, said anchor being adapted in operation to clamp or grip a rail of said track, means for setting said anchor in operation, a source of fluid pressure, a fluid pressure cylinder connected to said source and containing a piston, fluid actuated means including said cylinder and piston for retracting said anchor operating means, a wheel brake, means for setting said wheel brake in operation, a second fluid pressure cylinder, the intake end of said second cylinder being connected with the exhaust end of said first cylinder and containing a piston, fluid actuated means including said second cylinder and piston for retracting said wheel brake operating means, a source of electricity, a propelling motor for said vehicle in normally open circuit with said source, and means for automatically closing said circuit when said wheel brake is retracted and released.

4. The combination with a wheel supported vehicle, of a rail track therefor, an anchor for said vehicle, said anchor being adapted in operation to clamp a rail of said track, means for setting said anchor in operation, a fluid pump or compressor, a fluid pressure cylinder connected to said compressor and containing a piston, fluid actuated means including said piston for retracting said anchor operating means, a wheel brake, means for setting said wheel brake in operation, a second fluid pressure cylinder, the intake end of said second cylinder being connected with the exhaust end of said first cylinder, fluid actuated means including said second piston for retracting said wheel brake operating means, a source of electricity, electric means in circuit with said source for operating said pump or compressor, an exhaust valve at the intake end of said second cylinder, an electro-magnetic device in circuit with said source, said electro-magnetic device being adapted when energized to close said exhaust valve in said second cylinder, means for opening said valve when said electro-magnetic device is de-energized, said second cylinder having a safety exhaust port therein at its opposite end, a propelling motor for said vehicle in normally open circuit at a plurality of points with said source, and means for automatically closing said circuit at one of said points when said wheel brake is retracted and for opening said circuit at such point when the wheel brake is in operation.

5. The combination with a wheel supported vehicle, of a rail track therefor, an anchor adapted to clamp said track, a wheel brake, a source of fluid pressure supply and two fluid pressure cylinders connected in series, means adapted to be operated by fluid pressure in one of said cylinders to retract or release said anchor, and means adapted to be operated by fluid pressure in the other of said cylinders to retract or release said wheel brake.

In testimony whereof, I hereunto affix my signature, in presence of two witnesses.

MELVIN B. BENSON.

Witnesses:
C. E. MELBY,
H. L. LIBERTY.